(12) United States Patent
Jorgensen

(10) Patent No.: US 7,787,618 B2
(45) Date of Patent: Aug. 31, 2010

(54) PORTABLE ELECTRONIC DEVICE

(75) Inventor: Claus H. Jorgensen, Frederiksberg (DK)

(73) Assignee: Nokia Corporation, Espoo (FI)

( * ) Notice: Subject to any disclaimer, the term of this patent is extended or adjusted under 35 U.S.C. 154(b) by 861 days.

(21) Appl. No.: 11/393,510

(22) Filed: Mar. 29, 2006

(65) Prior Publication Data
US 2007/0265028 A1 Nov. 15, 2007

(51) Int. Cl.
*H04M 1/00* (2006.01)
*H04M 9/00* (2006.01)

(52) U.S. Cl. .............................. 379/433.13; 455/575.3

(58) Field of Classification Search ............ 379/433.01, 379/433.08, 433.11, 433.13; 455/90.3, 575.1, 455/575.3
See application file for complete search history.

(56) References Cited

U.S. PATENT DOCUMENTS

| | | | | |
|---|---|---|---|---|
| D427,171 S | 6/2000 | Frye et al. | .................. | D14/138 |
| 6,219,257 B1 | 4/2001 | Arnold | ........................ | 361/814 |
| 2001/0034242 A1* | 10/2001 | Takagi | ......................... | 455/550 |
| 2003/0199290 A1 | 10/2003 | Viertola | ................... | 455/575.1 |
| 2004/0253508 A1 | 12/2004 | Kohri et al. | ................. | 429/100 |
| 2005/0282593 A1 | 12/2005 | Spence et al. | ............ | 455/575.3 |

FOREIGN PATENT DOCUMENTS

| | | |
|---|---|---|
| EP | 1209880 A3 | 2/2003 |
| EP | 1533983 A1 | 5/2005 |
| EP | 1496672 A1 | 1/2006 |
| GB | 2391740 A | 2/2004 |
| JP | 2005-318064 A | 11/2005 |

* cited by examiner

*Primary Examiner*—Tuan D Nguyen
(74) *Attorney, Agent, or Firm*—Harrington & Smith

(57) ABSTRACT

A portable electronic device including a first section, a second section and a connecting section. The first section has a user input section and a first tubular housing member. The first tubular housing member forms a majority of opposite exterior lateral sides of the first section. The second section has a display and a second tubular housing member. The second tubular housing member forms a majority of opposite exterior lateral sides of the second section. The connecting section movably connects the second section with the first section. The first tubular housing member at least partially houses the user input section. The second tubular housing member at least partially houses the display.

20 Claims, 6 Drawing Sheets

PORTABLE ELECTRONIC DEVICE

BACKGROUND OF THE INVENTION

1. Field of the Invention

The invention relates to a portable electronic device and, more particularly, to form factor configuration of a portable electronic device.

2. Brief Description of Prior Developments

Ultra thin telephone products have emerged in the market, pioneering a new approach in mechanical architecture for flip-phone designs (also known a clam-shell handset). Priority for these products is mechanical thinness, allowing the feature set and industrial design to be adjusted to suit this goal. New flip-phones include the Motorola RAZR, the Motorola V3, the Motorola V3x, the Samsung SCH-V740, the NEC L1. For example, the Motorola RAZR has a thickness of about 0.54 inch. Candy-bar shaped mobile phones can have smaller thicknesses, such as the Motorola SLIVR with a thickness of about 0.45 inch and the Motorola SCALPEL with a thickness of about 0.25 inch.

There is a desire for an architecture for an ultrathin fold product, such as a flip-phone style of mobile telephone, which can maintain aesthetic balance in proportions, and allow added thickness to avoid a "squeezed" appearance as seen with the RAZR™ mobile telephone.

SUMMARY OF THE INVENTION

In accordance with one aspect of the invention, a portable electronic apparatus is provided comprising a first section comprising electronics; a second section movably connected to the first section by a hinge section, wherein the second section comprises a display; and an access entry provided in the hinge section adapted to allow insertion of an electrical device through the hinge section and into electrical connection with an electrical connector inside the first section.

In accordance with another aspect of the invention, a portable electronic device is provided including a first section, a second section and a connecting section. The first section has a user input section and a first tubular housing member. The first tubular housing member forms a majority of opposite exterior lateral sides of the first section. The second section has a display and a second tubular housing member. The second tubular housing member forms a majority of opposite exterior lateral sides of the second section. The connecting section movably connects the second section with the first section. The first tubular housing member at least partially houses the user input section. The second tubular housing member at least partially houses the display.

In accordance with another aspect of the invention, a mobile telephone is provided comprising an engine section comprising a printed circuit board, a transceiver, a processor and a memory; a battery located adjacent the engine section; and a user input section comprising a keypad located directly above the engine section and the battery. The user input section is located directly opposite the battery without a portion of the engine section therebetween.

In accordance with another aspect of the invention, a portable electronic device is provided comprising a first section; a second section movably connected to the first section by a hinge; and a camera. The hinge comprises a first hinge member connected to the first section and a second hinge member connected to the second section. The camera is connected to the second section. The camera is housed at an exterior side of the portable electronic device by a junction of a portion of the second hinge member and a portion of an exterior housing of the second section.

BRIEF DESCRIPTION OF THE DRAWINGS

The foregoing aspects and other features of the invention are explained in the following description, taken in connection with the accompanying drawings, wherein.

DETAILED DESCRIPTION OF THE PREFERRED EMBODIMENTS

Figure 1:
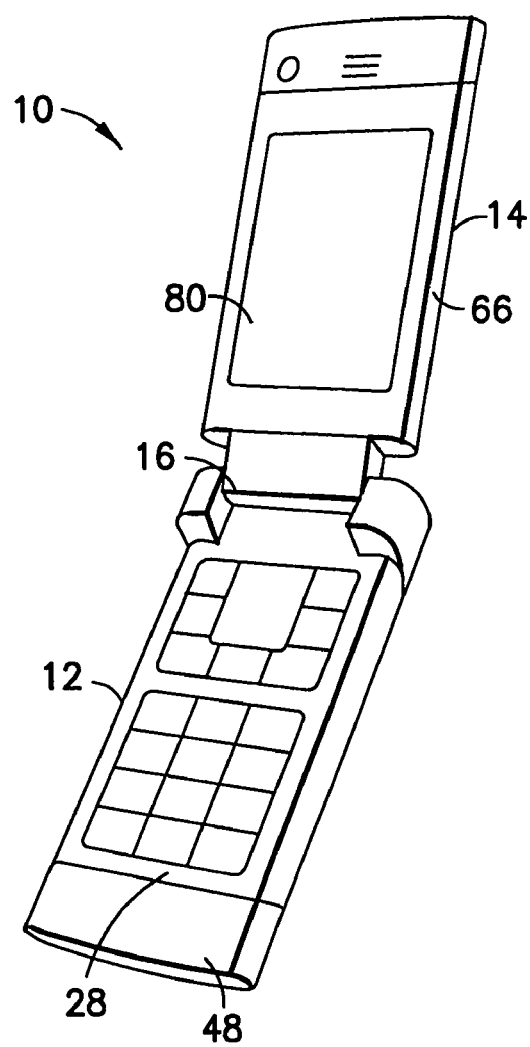
FIG. 1 is a perspective view of a mobile telephone comprising features of the invention.

Referring to FIG. 1, there is shown a perspective view of a portable electronic device 10 incorporating features of the invention. Although the invention will be described with reference to the exemplary embodiments shown in the drawings, it should be understood that the invention can be embodied in many alternate forms of embodiments. In addition, any suitable size, shape or type of elements or materials could be used.

Figure 2:
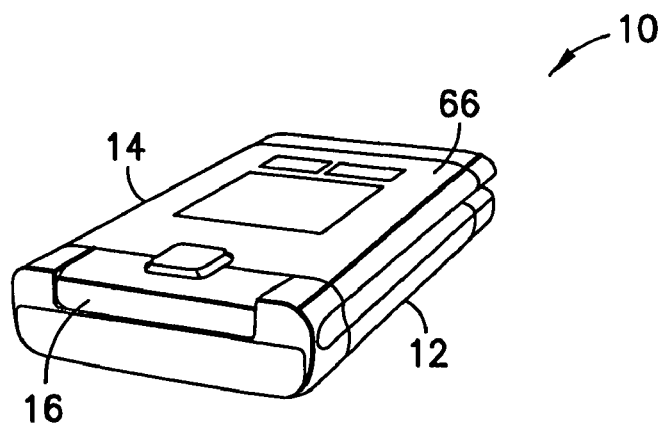
FIG. 2 is a perspective view of the telephone shown in FIG. 1 is a closed configuration.
Figure 3:
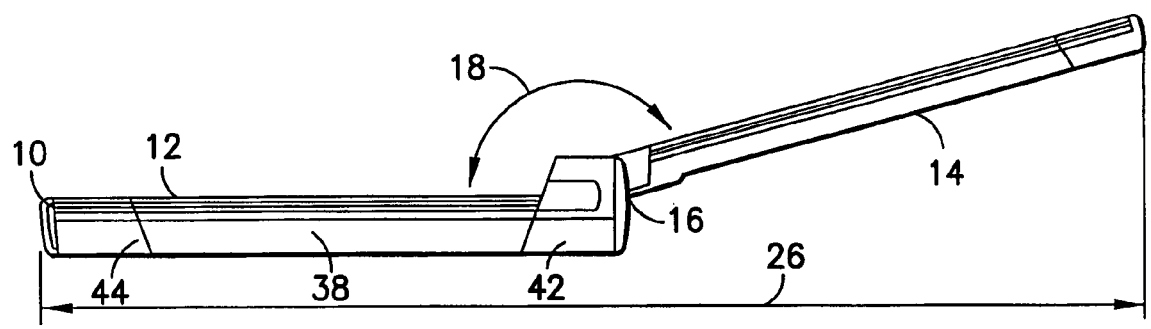
FIG. 3 is a side view of the telephone shown in FIG. 1.
Figure 4:
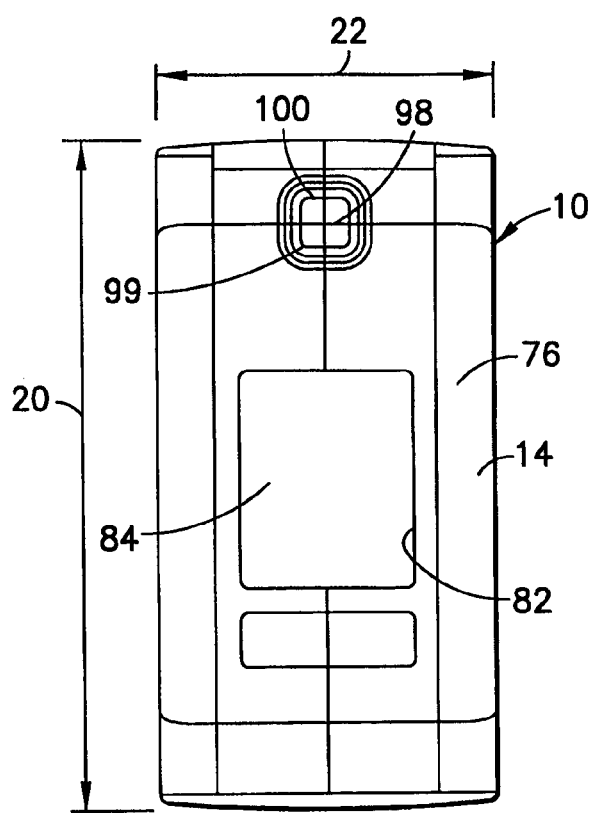
FIG. 4 is a front view of the telephone shown in FIG. 2.
Figure 5:
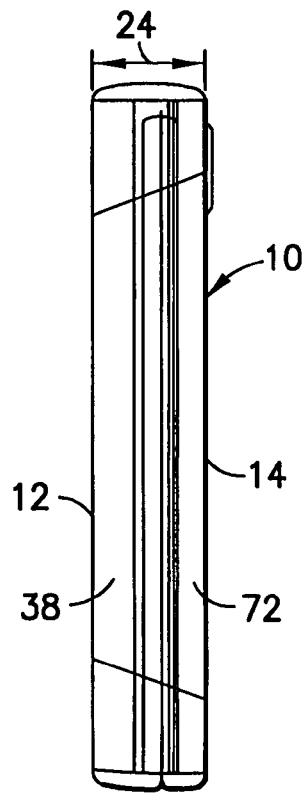
FIG. 5 is a side view of the telephone shown in FIG. 2.
Figure 6:
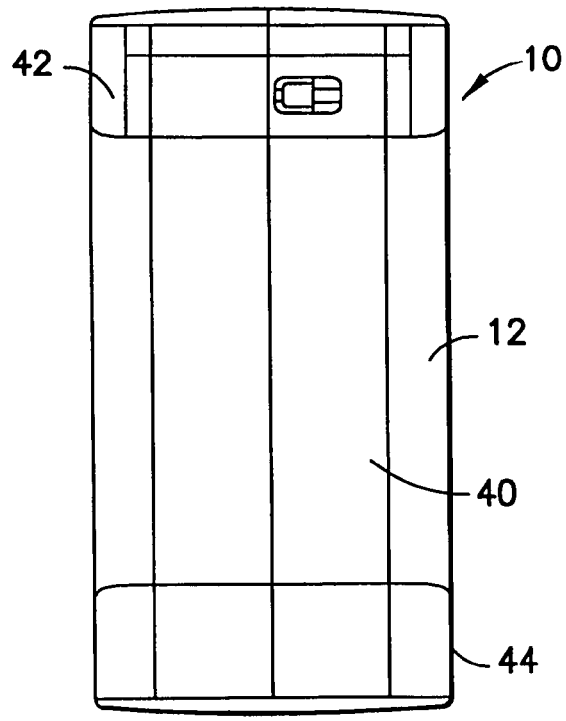
FIG. 6 is a rear view of the telephone shown in FIG. 2.

In the embodiment shown, the device 10 comprises a handheld mobile telephone. However, in alternate embodiments, features of the invention could be used in other types of portable electronic devices, such as a PDA or a hand-held gaming device for example. The telephone 10 is a flip-phone type of telephone comprising a first section 12 connected to a second section 14 by a movably connecting section 16. In this embodiment the connecting section 16 is a hinge. However, in alternate embodiments, any suitable type of movable connecting section could be provided. FIG. 1 shows the telephone 10 in an open configuration. FIG. 2 shows the telephone 10 in a closed configuration.

Referring also to FIGS. 3-6, in the closed configuration, the second section 14 lies directly opposite the first section 12. The hinge 16 allows the second section 14 to pivot open to the open configuration at an angle 18 of about 165°. However, in alternate embodiments, the angle 18 could have any suitable angle. In the closed configuration, the telephone has a height 20 of about 88.7 mm, a width 22 of about 45 mm, and a thickness 24 of about 15 mm. In the open configuration, the telephone has a length 26 of about 166 mm. However, in alternate embodiments, any suitable dimensions could be provided. As seen with reference to FIG. 3, the design shown has a substantially uniform thickness lower section 12 and a substantially uniform thickness upper section 14 along their entire lengths except for at the hinge 16. As seen best in FIGS. 5 and 14, when the two sections 12, 14 are closed, the telephone 10 has a block shape with grooves along the joints at the lateral sides, but with the ends of the sections 12, 14 being at the same bottom end of the closed shape.

Figure 7:
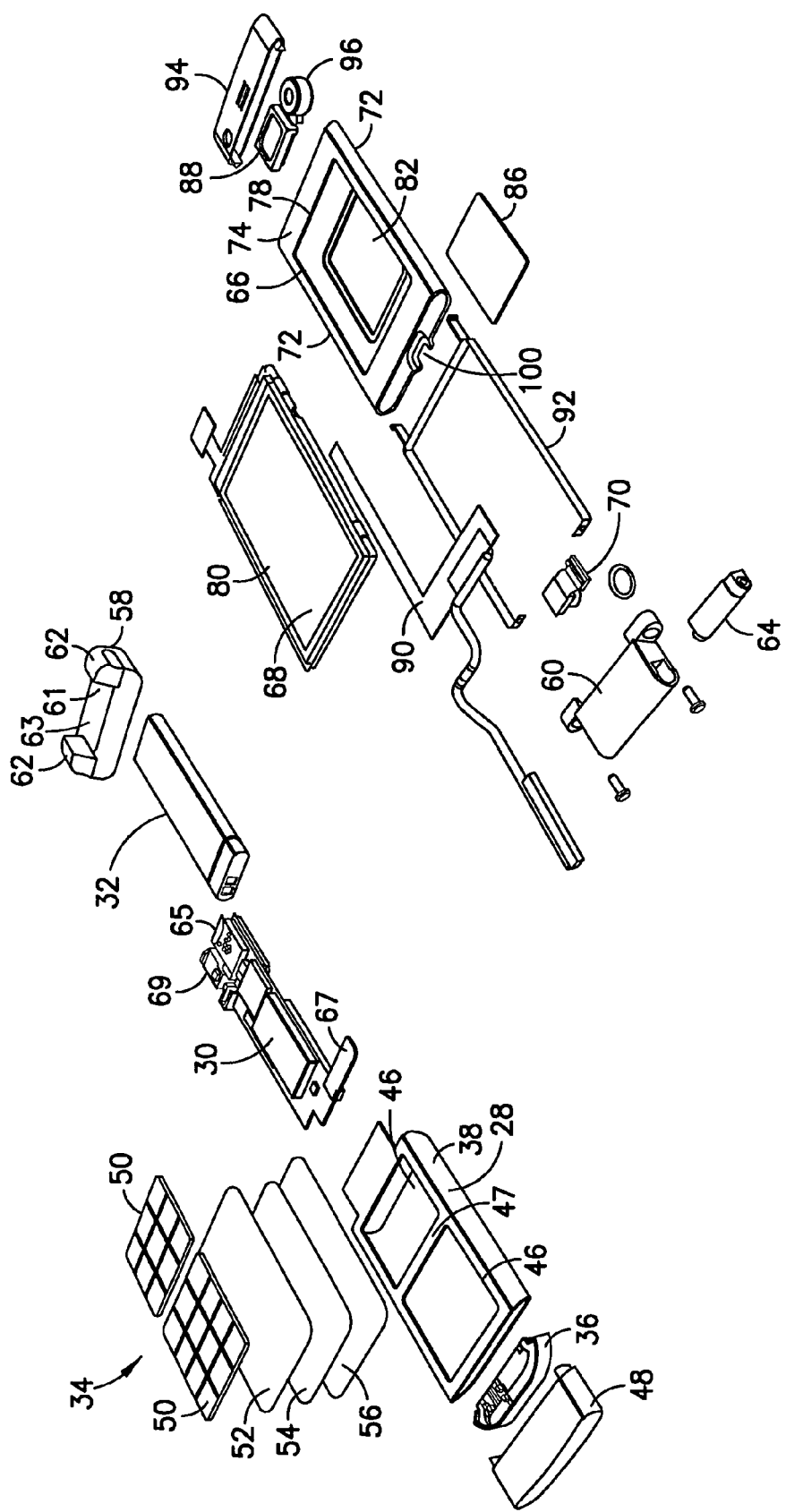
FIG. 7 is an exploded perspective view of the telephone shown in FIGS. 1-6.

Referring also to FIG. 7, there is shown an exploded perspective view of the telephone 10 for details of how the small thickness 24 of about only 15 mm in a flip-phone design can be accomplished. The first section 12 generally comprises a first housing member 28, an engine 30, a battery 32, a user input section 34, and an antenna module 36. Additional components could be provided. The first housing member 28 generally comprises a one-piece tubular member. In a preferred embodiment, the tubular member is comprises of metal, such as aluminum for example. In one type of embodiment, the tubular metal member could be formed from an extruded member with holes punched into it after it is extruded. The first housing member 28 forms a majority of opposite exterior lateral sides 38 and a rear side 40 of the first section 12 (except at top and bottom ends 42, 44 of the first section). The front side of the first housing member 28 has holes 46 therethrough for portions of the user input section 34 to be located in the holes. Because of the tubular shape of the first housing member 28, the first housing member 28 has substantially open top and bottom apertures, which are slanted in the embodiment shown.

The antenna module 36 is located at the bottom aperture into the first housing member 28 and enclosed by the antenna cover 48. The antenna cover 48, such as made of plastic, is attached to the first housing member 28 at the bottom aperture to keep the antenna module 36 attached to the rest of the telephone. In one type of embodiment, the antenna module could be a STINGRAY antenna from RaySat, Inc. However, any suitable antenna module could be provided.

The user input section generally comprises keymats 50, an EL backlight foil 52, a keymat dome sheet 54 and a keymat stiffener 56. However, in alternate embodiments, any suitable user input section could be provided. The keymats 50 are located in the holes 46 of the first housing member 28. The other components of the user input section are located inside the first housing member 28. A cross bar portion 47 of the first housing member 28 is located between the two keymats 50.

Figure 8:
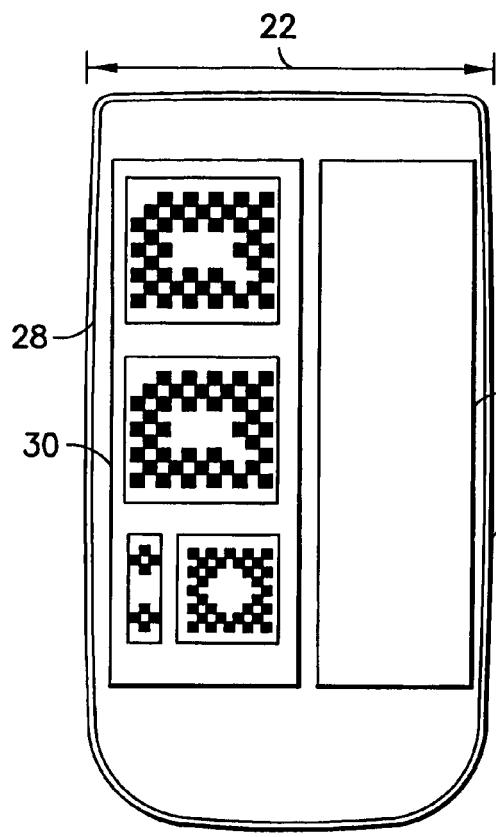
FIG. 8 is a schematic view showing the layout of the engine and the battery of the telephone shown in FIGS. 1-7.

The engine 30 generally comprises a printed circuit board, a transceiver, a processor, and a memory, among other components. Referring also to FIG. 8, the width of the engine 30 is only about less than half the width 22 of the telephone. The battery 32 is located adjacent the lateral side of the engine 30 and is also about less than half the width 22 of the telephone. Unlike conventional telephones which have the engine located above the battery, the configuration of the side-by-side engine/battery allows the battery and the engine to have a practical design thickness and still provide a reduced thickness 24 as compared to conventional flip-phones. The keypads are located above the engine section 30 and the battery 32, wherein the user input section 34 is located directly opposite the battery 32 without a significant portion of the engine section 30 therebetween.

The connecting section 16 has a first hinge member 58 and a second hinge member 60. The first hinge member 58 is connected to the top end of the first frame member 28 to substantially close the open top end of the first frame member 28. The first hinge member 58 also comprises a door 61 for access to the battery 32 such that the battery can be removed, and a door 63 for access to the engine 30 for inserting and removing an electronic module 65, such as a SIM card or flash memory or other memory card. The doors 61, 63 are located below the shoulders 62 such that there is a path at the connecting section 16 past the second hinge member 60. In an alternate embodiment, the connecting section 16 could have only one door; for the battery or for the electronic module or both. The door(s) is preferably connected to the rest of the first hinge member 58 by a living hinge. However, in alternate embodiments any suitable type of doorway system could be provided. In other alternate embodiments any suitable access entry could be provided. In a preferred embodiment the door (s) support the electronic device (such as the battery 32 and/or electronic module 65). The engine 30 comprises electrical connectors 67 and 69 for the electronic devices 32 and 65 to connect to inside the first section 12.

The first hinge member 58 has shoulders 62 with interior facing apertures to receive ends of the hinge module 64. The hinge module 64 is mounted in the second hinge member 60. The second hinge member 60 is sized and shaped to pivotably fit between the shoulders 62. In an alternate embodiment any suitable type of hinge assembly could be provided, such as disclosed in U.S. Pat. No. 6,900,981, and U.S. patent application Ser. Nos. 10/610,978, 11/055,914, 11/077,674, and 11/253,017, for example, which are hereby incorporated by reference in their entireties. In an alternate embodiment, the electronic device insertion and removal feature through a movable connection section of the invention could be used in other types of telephones having movable sections including, for example, a slide phone such as shown in U.S. Pat. No. Des. 427,171 which is hereby incorporated by reference in its entirety, or could be used in other apparatus, such as a gaming device or PDA having two movable sections connected by a hinge or connecting section.

The second section 14 generally comprises a second housing member 66, a display module 68 and a camera 70. The second housing member 66 preferably comprises a one-piece member having a general tubular shape. In a preferred embodiment, the tubular member is comprises of metal, such as aluminum for example. In one type of embodiment, the tubular metal member could be formed from an extruded member with holes punched into it after extrusion. The second housing member 66 forms portions of opposite exterior lateral sides 72, a front side 74 and a rear side 76 of the second section 14. The front side of the second housing member 66 has a hole 78. A front portion 80 of the display module 68 can be located for viewing through the hole 78. The rear side of the second housing member 66 has a hole 82 therethrough. A rear portion 84 (see FIG. 4) of the display module 68 is located for viewing through the hole 82. Front portion 80 forms a main display, and rear portion 84 forms a sub-display. A window 86 can be glued onto the sub-display 84. Because of the tubular shape of the second housing member 66, the second housing member 66 has substantially open top and bottom apertures, which are slanted in the embodiment shown.

The display module 68, camera 70 and a speaker or sound transducer 88 are coupled to the engine 30 by a flex cable assembly 90 which extends through the hinge 16. A mounting bracket 92 is provided for mounting the display module 68 inside the second housing member 66 between the second hinge member 60 and a speaker cover 94 at opposite ends of the second housing member 66. An optional second camera 96 could also be provided.

The camera 70 extends to the rear side 76 of the second section 14. The camera 70 is housed at an exterior side of the portable electronic device by a junction 98 of a cutout portion 99 of the second hinge member 60 and a cutout portion 100 of the second tubular housing member 66. The cutout portions 99, 100 project slightly from the rear side of the telephone to form a protrusion 142 (see FIG. 14). By providing a projecting portion of the housing for the camera, rather than making the housing flush with the camera, this allows the rest of the telephone to have the reduced thickness 24, but still use a standard size camera.

Figure 10:
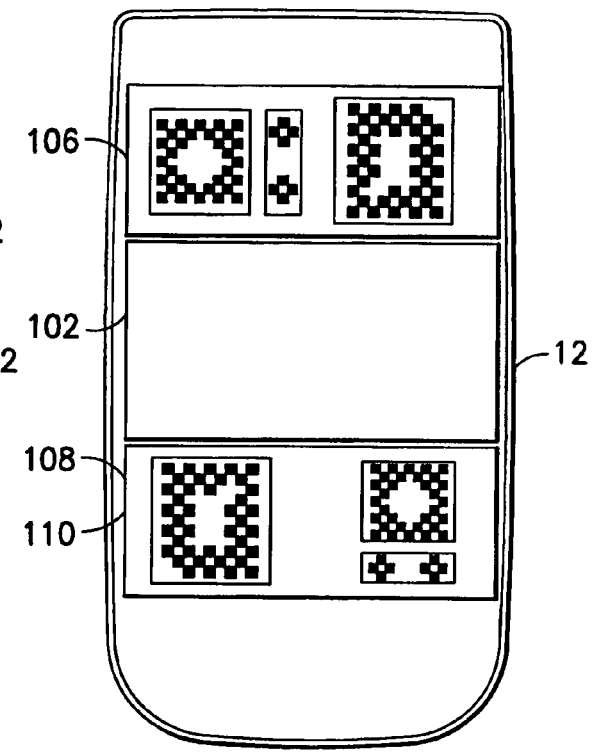
FIG. 10 is a schematic view similar to FIG. 8 showing another alternate embodiment of the layout of the engine and the battery.
Figure 9:
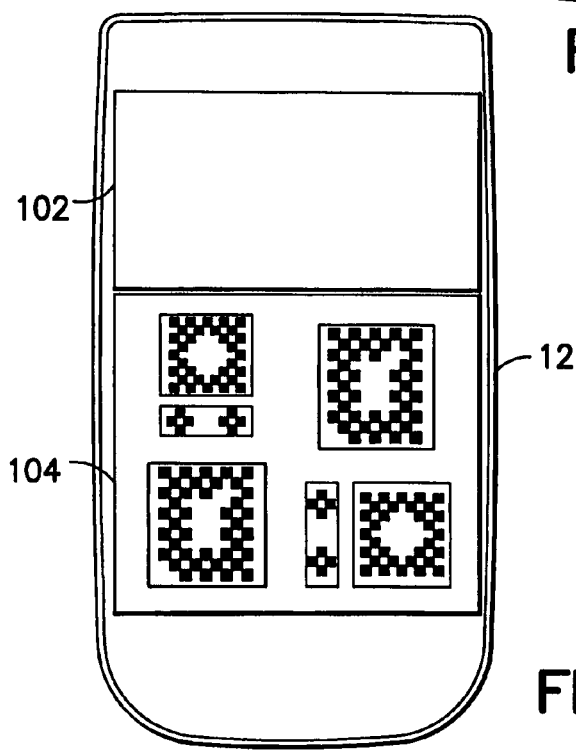
FIG. 9 is a schematic view similar to FIG. 8 showing an alternate embodiment of the layout of the engine and the battery.
Figure 11:
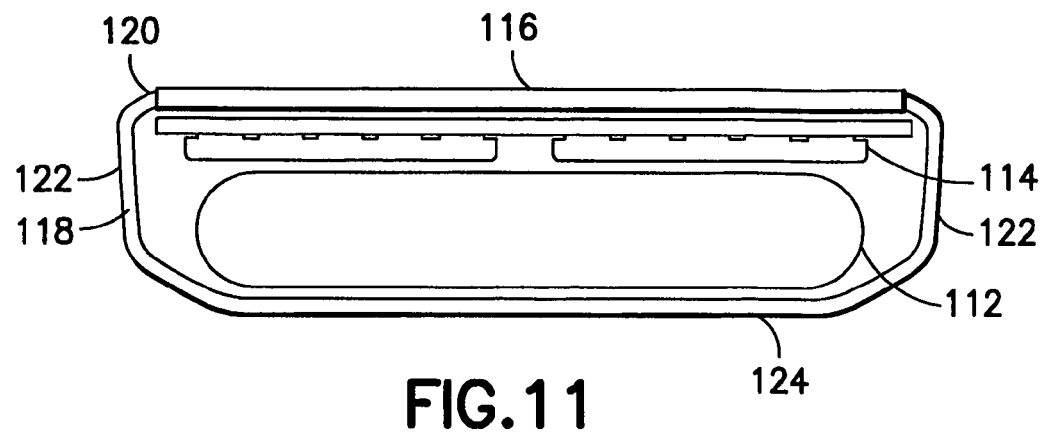
FIG. 11 is a schematic view showing an alternate embodiment of the layout of the engine and the battery.

Referring also to FIGS. 9-10, alternate embodiments of configuration of the battery relative to the engine of FIG. 8 is shown. FIG. 10 shows an embodiment where the battery 102 and engine 104 are located in the first section 12 in a side-by-side configuration. This side-by-side configuration comprises the battery 102 being located at a top side of the engine 104 proximate the hinge end of the first section. FIG. 11 shows an embodiment where the battery 102 is located between two portions 106, 108 of the engine 110. Thus a split side-by-side configuration is provided. In both of these alternate embodiments the keypad is located above the engine section and the battery, wherein the user input section is located directly opposite the battery without a substantial portion of the engine section therebetween.

Figure 12:
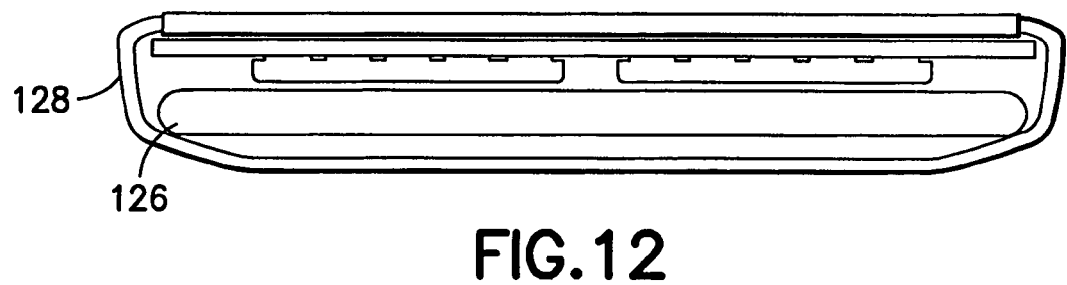
FIG. 12 is a schematic view similar to FIG. 11 showing an alternate embodiment of the layout of the engine and the battery.
Figure 13:
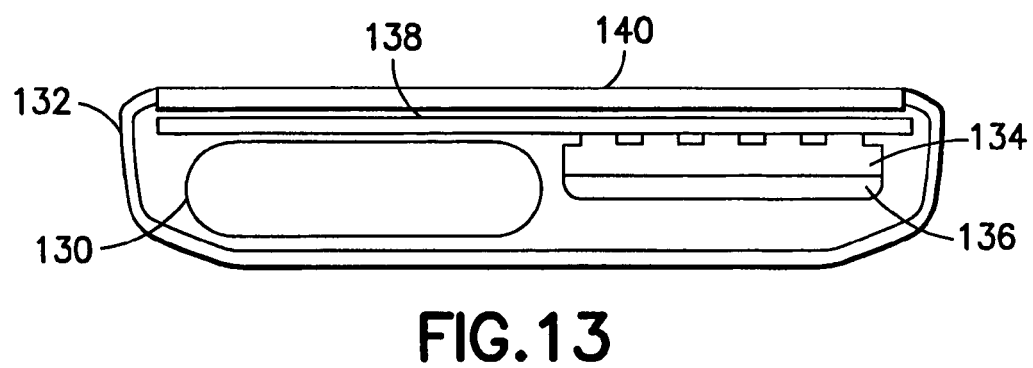
FIG. 13 is a schematic view similar to FIG. 11 showing an alternate embodiment of the layout of the engine and the battery.

FIGS. 11-13 show other alternate embodiments of positioning the battery relative to the engine. In FIG. 11 the battery 112 is located below the engine 114. The keypad 116 is located above the engine 114. The components 112, 114, 116 are housed in a one-piece metal tubular housing member 118. The keypad is located at a hole through the front side 120 of the housing member 118. Otherwise, the housing member 118 forms enclosed lateral exterior sides 122 and rear side 124.

FIG. 12 shows an embodiment similar to FIG. 11. However, in this embodiment the battery 126 is thinner and wider than the battery 112. The tubular housing member 128 is thinner and wider than the tubular housing member 118. FIG. 13 shows another alternate embodiment. In this embodiment the battery 130 is about half the width of the tubular housing member 132. The engine 134 comprises a portion 136 located at the lateral side of the battery 130 and another portion 138 located between the battery and the keypad 140. The configurations shown in FIGS. 11-13 could be used in candy-bar style telephone handsets as well as flip-phone style handsets.

One of the features of the invention is the use of tubular members to form the major housing components of the first and second sections of the flip-phones. The tubular housing members provide an increased strength than conventional housing designs. This allows the reduction in side of the housing components versus conventional housing components and, thus, a reduction in the thickness 24 of the telephone. In addition, the side-by-side positioning of the battery/engine can further allow a reduction in thickness of the handset versus conventional stacked battery/engine handsets.

With the present invention a user exchangeable battery and/or cards (SIM, flash and other memory cards) can be inserted and removed through the hinge end in a portable terminal. The housing of a fold phone can be extruded in one material. Extruding a housing in one material and having a user exchangeable battery (and cards) through a hinge end can be provided. With the invention a battery can be located next to the PWB on a lateral side of the phone.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. An apparatus comprising:
a first section comprising electronics;
a second section movably connected to the first section by a hinge section, wherein the second section comprises a display, wherein the hinge section comprises a first hinge member pivotably connected to a second hinge member; and
wherein the first hinge member comprises an access entry adapted to allow insertion of an electrical device through the access entry and into electrical connection with an electrical connector inside the first section.

2. An apparatus as in claim 1 wherein the access entry comprises a movable door on the hinge section.

3. An apparatus as in claim 2 wherein the access entry comprises a living hinge connecting the door to the rest of the hinge section.

4. An apparatus as in claim 1 wherein the access entry is sized and shaped to allow insertion of an electronic memory module through the access entry, and the electrical connector is adapted to electrically connect to the electronic module.

5. An apparatus as in claim 1 wherein the access entry is sized and shaped to at least partially directly physically support the electrical device when the electrical device is fully inserted into the apparatus.

6. An apparatus as in claim 1 wherein the access entry comprises a pivotable door on the hinge section.

7. An apparatus as in claim 1 wherein the access entry is adapted to allow modular insertion and removal of the electrical device through the access entry.

8. An apparatus comprising:
a first section comprising electronics;
a second section movably connected to the first section by a hinge section, wherein the second section comprises a display, wherein the hinge section comprises a first hinge member pivotably connected to a second hinge member; and
wherein the first hinge member comprises an access entry adapted to allow insertion of an electrical device through the hinge section and into electrical connection with an electrical connector inside the first section,
wherein the access entry is sized and shaped to allow insertion of a battery through the access entry, and the electrical connector is adapted to electrically connect to the battery.

9. A portable electronic device comprising:
a first section having a user input section and a first one-piece tubular housing member, wherein the first tubular housing member forms a majority of opposite exterior lateral sides of the first section;
a second section having a display and a second tubular housing member, wherein the second tubular housing member forms a majority of opposite exterior lateral sides of the second section; and
a connecting section movably connecting the second section with the first section,
wherein the first tubular housing member at least partially houses the user input section, and wherein the second tubular housing member at least partially houses the display, and wherein the first and second sections are movably connected to each other between an open configuration and a closed configuration.

10. A portable electronic device as in claim 9 wherein at least one of the first and second tubular housing members comprises a metal member.

11. A portable electronic device as in claim 10 wherein the first tubular housing members comprises an extruded member.

12. A portable electronic device as in claim 9 wherein the connecting section comprises a hinge with a first hinge member forming a cap to an open end of the first tubular housing member and a second hinge member forming a cap to an open end of the second tubular housing member.

13. A portable electronic device as in claim 9 wherein the first section comprises:
- an engine section comprising a printed circuit board, a transceiver, a processor and a memory;
- a battery located adjacent the engine section; and
- the user input section comprises a keypad located above the engine section and the battery, wherein the user input section is located directly opposite the battery without a portion of the engine section therebetween.

14. A portable electronic device as in claim 9 wherein the connecting section comprises a hinge, wherein the hinge comprises a first hinge member connected to the first section and a second hinge member connected to the second section; and the portable electronic device further comprises a camera connected to the second section, wherein the camera is housed at an exterior side of the portable electronic device by a junction of a portion of the second hinge member and a portion of the second tubular housing member.

15. A portable electronic device as in claim 9 wherein the portable electronic device comprises a mobile telephone having a transceiver.

16. A portable electronic device as in claim 9 wherein the connecting section comprises an access entry provided in the connecting section adapted to allow insertion of an electrical device through the connecting section and into electrical connection with an electrical connector inside the first section.

17. A portable electronic device comprising:
a first section;
a second section movably connected to the first section by a hinge, wherein the hinge comprises a first hinge member connected to the first section and a second hinge member connected to the second section; and
a camera connected to the second section, wherein the camera is housed at a first exterior side of the portable electronic device by a junction of a portion of the second hinge member located at the first exterior side and a portion of an exterior housing of the second section located at the first exterior side.

18. A portable electronic device as in claim 17 wherein the first section comprises:
a first tubular housing member, wherein the first tubular housing member forms a majority of opposite exterior lateral sides of the first section, and located at the first tubular section:
an engine section comprising a printed circuit board, a transceiver, a processor and a memory;
a battery located adjacent the engine section; and
a user input section comprising a keypad located directly above the engine section and the battery, wherein the user input section is located directly opposite the battery without a portion of the engine section therebetween.

19. A portable electronic device as in claim 17 wherein the first section comprises a tubular metal housing member forming a majority of opposite exterior lateral sides of the first section, and wherein the second section comprises a tubular metal housing member forming a majority of opposite exterior lateral sides of the second section.

20. A portable electronic device as in claim 17 wherein the first and second sections each comprises tubular metal exterior housing members comprising extruded metal members.

* * * * *